AMPLITUDE CONTROL CIRCUIT FOR STEREOPHONIC REPRODUCERS

Filed June 22, 1959

2 Sheets-Sheet 1

Inventors
E. W. Taylor
D. E. Kent
By Glascock Downing & Seebold
Att'ys.

Inventors
E. W. Taylor
D. E. Kent
By Glascock Downing & Seebold
Attys.

United States Patent Office 3,066,187

Patented Nov. 27, 1962

3,066,187

AMPLITUDE CONTROL CIRCUIT FOR STEREOPHONIC REPRODUCERS

Eric Wilfred Taylor, Gerrards Cross, and David Ernest Kent, Old Windsor, England, assignors to Electric & Musical Industries Limited, Hayes, England, a company of Great Britain Filed June 22, 1959, Ser. No. 821,736
Claims priority, application Great Britain July 4, 1958
8 Claims. (Cl. 179—1)

This invention relates to amplitude control circuits and relates especially to such circuits adapted for use in a stereophonic sound reproducing apparatus.

It has been proposed to provide a stereophonic sound transmission system in which there is provided an audio-signal representing sound and a control signal representing the direction or position of the source of said sound and is substantially independent of the loudness of the sound, the control signal being confined to a narrow range of low frequencies relative to the first signal, though it may extend into the audio frequency range. The control signal is such that when employed in sound reproducing apparatus to vary the output of two channels feeding spaced loudspeakers, or groups of loudspeakers, to which channels the audio-signal is fed in parallel, stereophonic reproduction of the sounds is obtained.

One difficulty encountered in such reproducing apparatus is that of ensuring that variations in the circuit parameters do not cause the apparent directions or positions of the sources of reproduced sounds to be displaced to one side.

The object of the present invention is to provide an improved amplitude control circuit which can be used to produce two output signals which have the same amplitude for a particular value of control signal and which undergo complementary variations in amplitude according as the control signal varies from that value.

According to the present invention there is provided an amplitude control circuit comprising a source of an alternating signal, the amplitude of which is to be controlled, a source of a variable control signal the range of variation of which includes and extends to both sides of zero value, means for controlling the amplitude of said first signal in dependence upon said control signal to produce an amplitude-controlled signal, two output channels, means for injecting portions of said first signal and of said amplitude-controlled signal into both of said output channels, said injecting means being predetermined to produce in the respective output channels two output signals which are the same amplitude for zero value of said control signal and which undergo complementary variations in amplitude according as the control signal varies from zero.

Preferably the means for controlling the amplitude of said first signal comprises an element which exhibits the Hall effect, in which case there are provided means for feeding current in one direction through the element in response to said first mentioned signal, and means for applying a magnetic field to the element perpendicular to the current in response to said control signal, the amplitude-controlled signal being derived in response to the potential difference set up across the element in a direction perpendicular to said current and said field.

It will be understood that in the application of the invention to a stereophonic reproducer, the first signal corresponds to the audio signal representing the sound to be reproduced, and the control signal corresponds to that signal which represents the direction or position of the source of the sound.

Accordingly, it is another object of the present invention to provide a stereophonic reproducer in which variations in the circuit parameters do not cause the apparent directions or positions of the sources of reproduced sounds to be displaced to one side or the other.

In order that the present invention may be clearly understood and readily carried into effect, the invention will now be described with reference to the accompanying drawings in which:

FIGURES 1*a* and 1*b* show, separated, two parts of an amplitude control circuit according to one example of the present invention and adapted for use in stereophonic sound reproducing apparatus.

Figure 1:
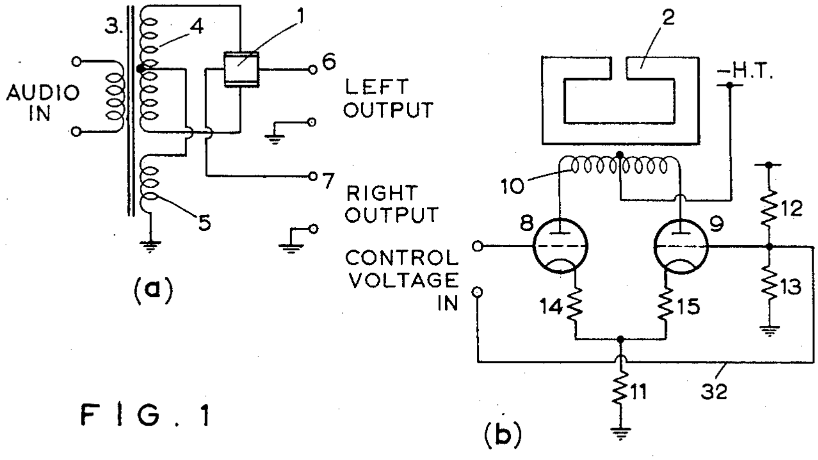

Referring to the drawing, reference 1 in FIGURE 1*a* denotes a Hall probe comprising a wafer-like element or crystal of semi-conducting material, for instance germanium, disposed in an air gap in a magnetisable core 2 (the core being shown in FIGURE 1*b*). The circuit is required to control the amplitude of an audio-signal by a control signal to yield two output signals which undergo complementary variations in amplitude in accordance with the control signal so that the two output signals can be used to drive spaced loudspeakers to give stereophonic reproduction, as indicated above. It will be assumed that the audio-signal is applied across the primary winding of a transformer 3 which has two secondary windings 4 and 5. The ends of the winding 4 are connected to electrodes applied to opposite edges of the probe so that the secondary winding 4 can feed current through the probe in a direction perpendicular to the magnetic field produced in the probe by the core 2, the direction of the magnetic field in the probe being perpendicular to the paper in FIGURE 1*a*. In FIGURE 1*b* however, the core 2 is indicated in such a way that the direction of the magnetic field in the probes would be parallel to the plane of the paper. The winding 5 is connected from ground to the centre tap of the winding 4 so that in effect it varies the mean potential of the probe by an amount representing a fraction of the audio-signal applied to the primary winding of the transformer 3. The output of the circuit, namely the Hall potential difference which is established across the probe 1 in a direction mutually perpendicular to the aforesaid current and the aforesaid field, is derived from terminals 6 and 7, two outputs being obtained symmetrically with respect to ground and applied respectively to the spaced loudspeakers.

The control signal is, it will be assumed, applied between control electrodes of two valves 8 and 9, shown in FIGURE 1*b*. As aforesaid the control voltage has zero value when the sound source is centrally positioned in the stereophonic field and has (say) positive and negative values to indicate displacement to the left and right respectively. The anodes of the valves 8 and 9 are connected to the ends of a coil 10 wound on the core 2, the centre tap of which is connected to the anode voltage source for the valves. The valves 8 and 9 have a common cathode resistor 11 which in conjunction with resistors 12 and 13 set the mean D.C. current through the valves, and individual cathode resistors 14 and 15 which are adjusted so that the magnetic field in the air gap of the core 2 is zero when the control voltage is zero. The resistances of 14 and 15 are preferably large compared with the reciprocals of the cathode slopes of the valves 8 and 9.

In setting up the circuits shown in FIGURES 1*a* and 1*b* the steady audio-signal developed across the auxiliary winding 5 of the transformer 3 is fed equally and in the same polarity to the terminals 6 and 7. However the application of magnetic field to the probe in response to the control signal causes audio-voltages of opposite polarity to appear at the terminals 6 and 7, to increase one output and decrease the other in complementary manner as required.

Figure 6:
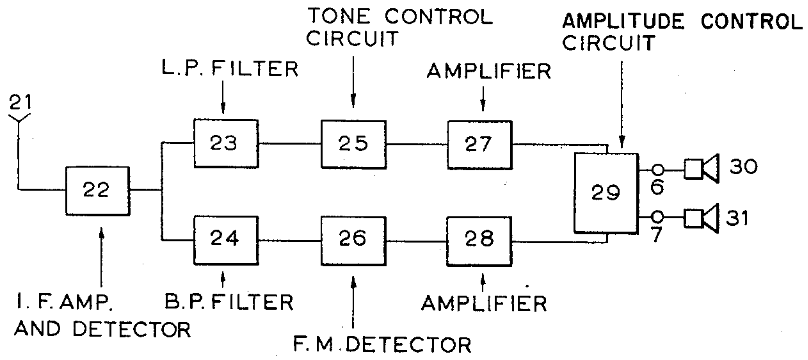
FIGURE 6 illustrates, in block form, one example of stereophonic sound reproducing apparatus incorporating a multiplying circuit according to the present invention.

The application of FIGURE 1 to a stereophonic sound receiver is illustrated by FIGURE 6. It is to be assumed that the receiver represented in FIGURE 6 is adapted for the reception of stereophonic sound signals comprising an audio signal representing sound, and a control signal which represents the direction or position of the source of the sound. The audio frequency signal occupies the normal audio frequency range whereas the control signal occupies a range of frequencies from zero frequency up to say 100 c./s., the signals being produced as described for example in the United States application Serial No. 689,431, filed October 10, 1957

In the following description the audio signal is denoted as $V_A$, and the control signal is denoted as $$\frac{(V''_L - V''_R)}{(V''_L + V''_R)}$$

In this expression $V''_L$ and $V''_R$ are signals derived from the outputs of two directional microphones exposed to the original sound. $V''_L$ and $V''_R$ may for example represent the envelopes of the outputs of these microphones after said outputs and/or said envelopes have been subjected to processing, for example to emphasise high frequency components of the microphone outputs and/or transients of the respective envelopes. The audio signal is preferably derived by combining the outputs of the two directional microphones aforesaid so that it can be used not only to produce stereophonic reproduction by a receiver such as indicated, but can be used for monophonic reproduction in a conventional receiver. It is further to be assumed that the control signal is broadcast from the transmitter by causing it to modulate the frequency of a carrier wave, which may be transmitted as a subsidiary carrier wave by causing it in turn to modulate the amplitude of a main carrier wave also modulated in amplitude by the audio signal $V_A$. The frequency of the subsidiary carrier wave is selected so that it is higher than the highest frequency of the audio signal so that the side bands which are produced when it is caused to modulate the main carrier wave lie outside the frequency range of the side bands produced by the audio signal.

In FIGURE 6, 21 represents the aerial of the receiver and 22 the initial amplifying, frequency changing and demodulating stages, which may be conventional, subject to the condition that the pass band must be sufficient to accommodate not only the side band corresponding to the audio signal but also those corresponding to the control signal. The output of the stages 22 is applied in parallel to a low pass filter 23 and a band pass filter 24 which select the audio signal $V_A$ and the control signal respectively. The audio signal $V_A$ is passed to a tone control circuit 25 and a low frequency amplifier 27 whilst the control signal is applied from the filter 24 to a frequency modulation detector 26 and to a low frequency amplifier 28. The two signals $V_A$ and $$\frac{V''_L - V''_R}{V''_L + V''_R}$$

are now applied to the amplitude control circuit illustrated in FIGURE 1, this circuit being represented in FIGURE 6 by the rectangle 29. The amplitude control circuit is usually called the multiplying circuit since the Hall probe in the multiplying circuit produces an amplitude-controlled signal representing the product $$V_A \frac{V''_L - V''_R}{V''_L + V''_R}$$

and applies this amplitude controlled signal, with opposite polarities to the terminals 6 and 7. The amplitude control or multiplying circuit additionally injects the signal $V_A$ to the terminals 6 and 7 with like polarities, in such proportions that two resulting output signals are produced representing respectively $$V_A\left(1+\frac{V''_L - V''_R}{V''_L + V''_R}\right) \text{ and } V_A\left(1-\frac{V''_L - V''_R}{V''_L + V''_R}\right)$$

These output signals are equivalent to $$2V_A \frac{V''_L}{V''_L + V''_R} \text{ and } 2V_A \frac{V''_R}{V''_L + V''_R}$$

It will be appreciated that the control signal has zero value when $V''_L$ equals $V''_R$, representing a source of sound which is centrally located in the field from which the sound is picked up. The two audio signals derived from the amplitude control circuit are equal when the control signal is zero, being equal to $V_A$ in each case. Furthermore when the control signal increases positively, representing a source of sound displaced to the left from the central position, the first output of the amplifier increases and the second output of the amplifier decreases and conversely when the control signal increases negatively from zero, the sum of the output signals in all cases being $2V_A$, so that the amplitude variations are complementary. The output signals appearing at the terminals 6 and 7 are applied, via further amplifiers if required, to left and right hand loudspeakers 30 and 31 which are spaced from each other in a horizontal plane, to give stereophonic reproduction of the original sound when the signals appearing at the terminals 6 and 7 are applied to these loudspeakers. In practice, the loudspeakers 30 and 31 may be replaced by groups of loudspeakers. Alternatively only relatively high frequency components of the audio signal may be applied to the amplitude control circuit 29, for example the components above 300 c./s. and in this case the loudspeakers 30 and 31 may be adapted to respond primarily to audio signals above that frequency, and the relatively low frequency audio signals may be applied directly from the amplifier 27 to a separate, centrally located loudspeaker responsive primarily to low frequency signals, to separate left and right speakers near the speakers 30 and 31, or even to the speakers 30 and 31 if they have an adequate response range.

Figure 2:
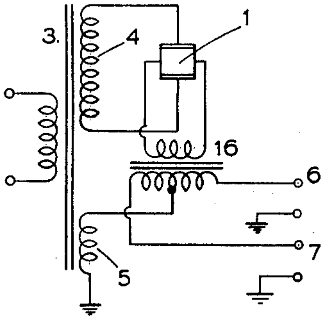
FIGURES 2 to 5 illustrate modifications of FIGURE 1*a*.

FIGURE 2 illustrates a modification of FIGURE 1*a* which can be adopted when the signal level obtained from the Hall probe is increased by means of an output transformer 16. In this case the auxiliary winding 5 instead of being connected to the mid point of the winding 4 of the transformer 3 can be connected to the mid point of the secondary winding of the transformer 16.

Figure 3:
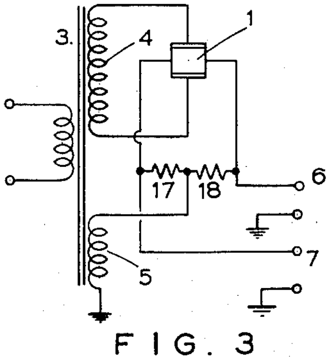

FIGURE 3 illustrates a similar arrangement where the signal output is taken directly from the Hall probe. The auxiliary winding 5 is connected to the intermediate point of two equal resistors 17 and 18 connected between the output terminals 6 and 7. This is the preferred form of the circuit and in one practical application a potentiometer is connected across the winding 5 and the junction of the resistors 17 and 18 is connected to the adjustable tap on the potentiometer, instead of to the top of the winding 5, so that the level of the added signal may be adjusted.

Figure 4:
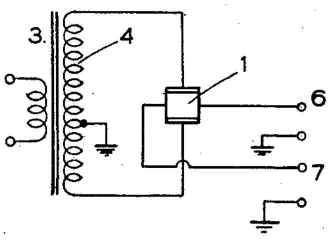
Figure 5:
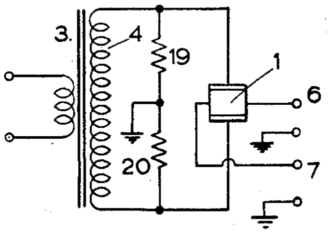

In the modification of FIGURE 1*a* which is illustrated in FIGURE 4 the auxiliary winding is rendered unnecessary by connecting an off-centre point of the secondary winding 4 to ground. In the further modification illustrated in FIGURE 5 the same effect is produced by connecting resistors 19 and 20 from one end of the winding 4 to the other, the junction of the resistors being grounded and the resistors being unequal. It will also be understood that other methods of introducing the push-push component into the push-pull output from the probe may be employed.

The arrangements illustrated have the advantage of simplicity and symmetry. Both the output signals are obtained at the same impedance level and polarity and any positioning errors attributable to the amplitude control circuit will be symmetrical about the centre of the stereophonic field, this latter feature arising because the Hall probe is worked on both sides of the zero magnetic field condition.

Although the invention is especially applicable to arrangements in which a symmetrical control signal is available, the arrangement described may be adapted for use with an asymmetrical control signal, representing $$\frac{V''_L}{V''_L+V''_R}$$

for example. A control signal of this form has zero value for a sound source on the extreme right, unit value for a sound source on the extreme left, and the value ½ for a central sound source. When the control signal is of this form, it can be biassed so as to have zero value for a central sound source by adding a D.C. component to the control voltage. This may be obtained for example by connecting the wire 32 in FIGURE 1*b* to a potential different from that of the control electrode of the valve 9, and such potential may conveniently be derived from a tapping point on resistor 13. This application of the circuit retains the advantage that positional errors due to effects of temperature on the Hall probe will occur symmetrically about the centre and thus only affect the "spread."

Figure 7:
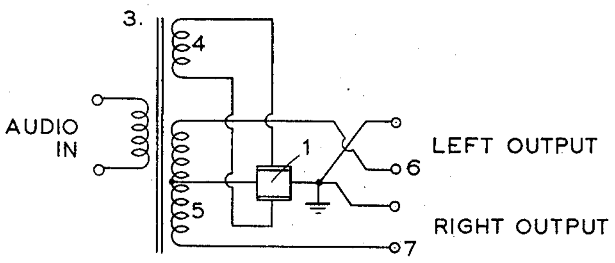
FIGURE 7 illustrates a modification of FIGURE 1.

In the modification of the invention which is illustrated in FIGURE 7, the same result is achieved as by the arrangements shown in FIGURES 1 to 5 but in this case the amplitude controlled signal produced by the control signal and the audio signal is applied with like polarities to the two terminals 6 and 7 whereas the initial audio signal is injected with opposite polarities to these two terminals. The arrangement shown in FIGURE 7 is generally similar to that shown in part (*a*) of FIGURE 1 but the output leads of the Hall probe are connected, respectively, to earth and to the mid point of the transformer winding 5 whereas the output terminals 6 and 7 are connected to the opposite ends of that winding. An analysis of the operation of this circuit will give the same result as the arrangement shown in FIGURE 1, except for the fact that one resultant output signal has negative polarity with respect to the other. It will be understood moreover that similar modifications can be made in the arrangements shown in FIGURES 2 to 5.

It will also be understood that any of the forms of amplitude control circuits illustrated in the drawings can be employed for the circuit represented by the rectangle 29 in FIGURE 6.

The invention is not confined to amplitude control circuits which use Hall probes, nor is it confined in its application to stereophonic sound reproducers and may be applied to other situations in which two outputs are desired from an amplitude control process which may undergo complementary variations in amplitude from equal values as the control signal varies from zero value.

In the specification the expression "Hall probe" is used to denote any substance which exhibits the Hall effect and has leads or electrodes for applying current to it and for deriving voltage from it, the substance being either self-supporting, or being suitably mounted so that it can be maintained in position in a magnetic field.

What we claim is:

1. An amplitude control circuit comprising a source of an alternating signal, the amplitude of which is to be controlled, a source of a variable control signal, the range of variation of which includes and extends to both sides of zero value, an element which exhibits the Hall effect, means for feeding current in one direction through said element in response to said first signal, means for applying a magnetic field to said element perpendicular to said current in response to said control signal, two output channels, means connected to said Hall element to derive an amplitude-controlled signal in response to the potential difference set up across said element in a direction perpendicular to said current and said field, and injecting means for injecting into said two output channels said amplitude-controlled signal and signal portions representing a fraction of said first signal to produce two output signals in said channels which have the same amplitude for zero value of said magnetic field and which undergo complementary variations in amplitude according as said magnetic field varies from zero.

2. An amplitude control circuit according to claim 1 comprising a transformer having primary turns energized by said first signal, having secondary turns connected to opposite edges of said element so as to feed said current through said element in response to said first signal, and said injecting means including further secondary turns for injecting said signal portions representing a fraction of said first signal into said output channels.

3. An amplitude control circuit according to claim 1 wherein said injecting means comprises means for injecting portions of each of said first signal and said amplitude controlled signal with like polarities into one of said output channels, and means for injecting portions of each of said first signal and said amplitude controlled signal with unlike polarities into the other of said output channels.

4. An amplitude control circuit according to claim 2 wherein said injecting means further includes two conductors, each of said conductors connecting the respective one of said output channels to one end of said further secondary winding.

5. An amplitude control circuit according to claim 2 wherein said first mentioned secondary turns and said further secondary turns are provided by separate secondary windings of said transformer.

6. An amplitude control circuit according to claim 2 wherein an off-centre point of said first mentioned secondary turns is maintained at a fixed potential, so that said further secondary turns are included in said first mentioned secondary turns.

7. A stereophonic reproducer comprising means for providing an audio signal representing sound to be reproduced, means for providing a control signal representing the direction or position of the source of said sound and substantially independent of the loudness of said sound, said control signal having a range of variation which includes and extends to both sides of zero value, means for controlling the amplitude of said audio signal in dependence upon said control signal to produce an amplitude-controlled audio signal, two loudspeakers which are adapted to give stereophonic reproduction, means for energizing said loudspeakers each with a portion of said first mentioned audio signal and each with a portion of said amplitude-controlled audio signal, said energizing means being predetermined to cause the loudspeakers to produce sounds which have the same amplitude for zero value of said control signal and undergo complementary variations in amplitude according as said control signal varies from zero.

8. A stereophonic reproducer comprising means for providing an audio signal representing sound to be reproduced, means for providing a control signal representing the direction or position of the source of said sound and substantially independent of the loudness of said sound, an element which exhibits the Hall effect, means for feeding current in one direction through said element in response to said audio signal, means for applying a magnetic field to said element perpendicular to the current in response to said control circuit, two loudspeakers which are adapted to give stereophonic reproduction, means for energizing said loudspeakers in response to the potential difference set up across said element in a direction perpendicular to said current and said field, means for additionally energizing said loudspeakers in response to said audio signal, said means for energizing said loudspeakers being predetermined to cause the loudspeakers to reproduce sounds having the same amplitude for a particular value of said control signal and which undergo complementary variations in amplitude according as said control signal varies from said particular value.

References Cited in the file of this patent

UNITED STATES PATENTS 2,481,576 De Boer ---------------- Sept. 13, 1949
2,877,309 Henisch ---------------- Mar. 10, 1959

FOREIGN PATENTS 854,639 Great Britain ---------- Nov. 23, 1960

OTHER REFERENCES

Carroll: "Recent Developments in Stereo Broadcasting," Electronics, April 3, 1959 (pp. 43–44 and FIG. 5 relied on).